United States Patent [19]
Markowitz

[11] Patent Number: 5,765,508
[45] Date of Patent: *Jun. 16, 1998

[54] INTERACTIVE GAME BETWEEN PET AND OWNER

[76] Inventor: Eli Markowitz, 1173 - 52nd St., Brooklyn, N.Y. 11219

[*] Notice: The term of this patent shall not extend beyond the expiration date of Pat. No. 5,524,326.

[21] Appl. No.: 660,924

[22] Filed: Jun. 10, 1996

Related U.S. Application Data

[62] Division of Ser. No. 6,956, Jan. 21, 1993, Pat. No. 5,524,326.

[51] Int. Cl.⁶ ........................... A01K 29/00
[52] U.S. Cl. ........................... 119/707; 446/456
[58] Field of Search ................ 119/702, 707, 119/839; 446/280, 456

[56] References Cited

U.S. PATENT DOCUMENTS

| | | | |
|---|---|---|---|
| 3,303,821 | 2/1967 | Harris | 446/456 X |
| 4,391,224 | 7/1983 | Adler | 119/707 |
| 4,662,856 | 5/1987 | Getgey et al. | 446/280 |
| 5,524,326 | 6/1996 | Markowitz | 119/707 |

FOREIGN PATENT DOCUMENTS

| 2119267 | 11/1983 | United Kingdom | 446/456 |
|---|---|---|---|

*Primary Examiner*—Robert P. Swiatek
*Attorney, Agent, or Firm*—Malina & Wolson

[57] ABSTRACT

A game is provided wherein a pet and its owner can interest through play with a remotely controlled toy system. The system includes a mechanically movable toy animal, a control box separate from the toy animal and, optionally, an enclosure structure sufficiently large for surrounding the toy animal. In the game method, a pet, such a household cat, chases the remotely controlled toy animal which may be in the shape of a rodent. Besides evasive movements, the toy animal can evade capture by the cat through entry into the enclosure structure. Both the human operator of the toy animal and the pet can create a new friendship by joint participation in this game.

13 Claims, 2 Drawing Sheets

5,765,508

1
INTERACTIVE GAME BETWEEN PET AND OWNER

This is a divisional of application Ser. No. 08/006,956 filed Jan. 21, 1993, and now U.S. Pat. No. 5,524,326.

BACKGROUND OF THE INVENTION

1. Field of the Invention

The invention concerns a game wherein a pet and its owner can interest through play with a remotely controlled animal toy.

2. The Related Art

A variety of radio frequency controlled toys have been described in the prior art and have been available in commerce. These toys are directed towards children for their amusement, and occasionally their education.

Illustrative of this technology is U.S. Pat. No. 4,623,320 (Kakizaki et al.) which describes a dragon shaped movable toy powered by a motor. The motor drives a rotary element which is associated with a flywheel capable of independent rotation. The flywheel interacts with a switch to shift output of the motor each time the speed of the flywheel differs from that of the rotating elements. In U.S. Pat. No. 5,158,493 (Morgruy) is illustrated a robotic biped or quadruped displaying special right and left leg/foot assemblies with freedom for movement relative to one another. Additionally the art includes a series of patents related to radio controlled vehicles within a sphere. For instance, see U.S. Pat. No. 4,438,588 (Martin), U.S. Pat. No. 4,501,569 (Clark et al.), U.S. Pat. No. 4,541,814 (Martin), U.S. Pat. No. 4,927,401 (Sonesson), and U.S. Pat. No. 5,041,051 (Sonesson).

Beyond amusement purposes, radio controlled vehicles have also been employed for commercial purposes. Illustrative is U.S. Pat. No. 3,303,821 (Harris) describing an animal training device. More particularly, this device is a mechanical calf used in training horses which will ultimately be employed in cattle herding operations.

Based on the foregoing review of the art, it is evident that hitherto there has not been any description of an amusement game involving both a remote control mechanical device and a live animal.

Not only human players but pets such as cats and dogs crave amusement. A game system would be highly desirable wherein both the pet and owner could be mutually involved. Physical conditioning and attitude of a pet could also benefit from an interactive game, especially if the pet is old or handicapped.

Accordingly, it is an object of the present invention to provide a game and related toy system that can be enjoyed both by a pet and its owner.

Another object of the present invention is to provide a game and toy system that will create a new mode of communication (dialogue) between a pet and its owner.

Still another object of the present invention is to provide a game and toy system for mentally and physically stimulating a pet, especially an animal that is spatially confined such as a cat confined to an apartment or house.

These and other objects of the present invention will become more readily apparent upon consideration of the following detailed information.

SUMMARY OF THE INVENTION

A method for amusing a live pet animal with a game whose equipment comprises:

a mechanically movable toy animal whose components include:
- a platform mounted with a mechanism for receiving a remote electronic signal;
- a mechanism for mechanically inducing motion of the platform based upon activation by the remote electronic signal, the motion mechanism being mounted on the platform;
- a first power source for operating the motion mechanism; and
- a housing covering the platform and the motion mechanism, the housing being in the shape of an animal;

a control box separate from the toy animal including:
- a mechanism for transmitting the remote electronic signal;
- a mechanism for regulating the remote electronic signal so as to alter directional movements of the toy animal; and
- a second power source for operating the control box;

wherein the method comprises:
(i) directing by remote control through the control box the toy animal into a line of vision of the live pet animal; and
(ii) evading capture of the toy animal by the live pet animal through manipulation by further remote control of the toy animal.

The housing that is in the shape of an animal preferably resembles a rodent. Typical rodents include a mouse, rat, squirrel and rabbit.

The remote electronic signals are preferably radio frequency signals. The toy animal receives the electronic signals through an antenna attached to the housing. Preferably the antenna is camouflaged, especially camouflaged to resemble a tail of the animal such as a mouse or rabbit tail.

First and second power sources will usually be batteries. For the first power source a series of four AAA alkaline or Ni-Cd batteries may be utilized (about 1.5 volts each). The second power source may be a 9 volt battery.

An optional feature of the invention may be a sound system positioned within the toy animal or control box. This system emits sounds mimicking sound emitted by the real animal which the toy is created to resemble. In this manner is achieved a more realistic toy.

Increased realism optionally may also be achieved by a vibratory mechanism within the toy animal. Vibrations generated by this mechanism may oscillate the tail or simulate breathing by periodically expanding abdominal areas along the housing.

A further optional prop for the game is that of an enclosure, which may resemble a house, building, cave or log. The enclosure can be formed at least in part of a transparent wall to allow the toy operator to correctly direct the toy and to allow the live pet to view movement of the toy within the enclosure.

A means for egress of the toy animal from the enclosure is provided in the form of at least one opening in a wall at a base of the enclosure. Preferably there are at least two openings. There also may be at least one window hole which is of a size sufficient for a paw of a live house pet to pass therethrough. The size of the window hole should be at least the size of a cat's paw but smaller than a cat's upper limb. More specifically, the at least one window may have a size ranging anywhere from about 1 to about 10 square inches in area.

In one embodiment of the invention, the enclosure will have a roof that is either collapsible or foldable under a predetermined weight. Collapse may be caused by a live house pet mounting the roof. The pet's weight creates a split in the enclosure thereby either establishing a new egress opening for the toy animal or at least retaining the original egress.

The aforedescribed game and toy system when played with a live cat (pet) and toy mouse with the enclosure operates in the following manner. The toy operator drives the mouse towards the enclosure structure. The pet cat sees either through the window holes or transparent walls that there is a mouse moving within the enclosure structure. The hunting instinct of the cat becomes activated. The operator can through remote control allow the mouse to enter or exit the enclosure structure. Upon entering the cat's line of vision, the mouse can be led by remote control to re-exit or reenter the enclosure structure thereby avoiding capture by the cat. During the game, the cat may attempt to snare the structure protected mouse by placing a paw through one of the window holes. These holes will allow entrance of the paw but only to a length limited by the larger size of the cat's upper limb.

Another way the game may be played is when the enclosure structure is collapsible or foldable. When the cat jumps on top of the enclosure structure to await the mouse's exit or tracking movement of the mouse within the enclosure structure, the roof will collapse through the cat's weight. As a result of the collapse the split structure creates additional egress exits under which the mouse can escape.

According to the invention, the game reveals the personality of the cat, sharpens the pet's hunting skills, and creates a new way of communication between owner and pet. Boredom for the game operator (owner) and the cat is solved. While the aforementioned description has specifically focused upon a pet cat and toy mouse, the game is not so limited. For instance, a pet dog may be involved in this game where the toy animal has the shape of a rabbit or even of a toy cat. The toy rabbit or cat can be led around a racetrack ahead of the pet dog. The game can also be played with multiple players and multiple toy animals.

BRIEF DESCRIPTION OF THE DRAWING

The above object, features and advantages of this invention will become more readily apparent from the following detailed description and the accompanying drawings in which.

DETAILED DESCRIPTION

Figure 1:
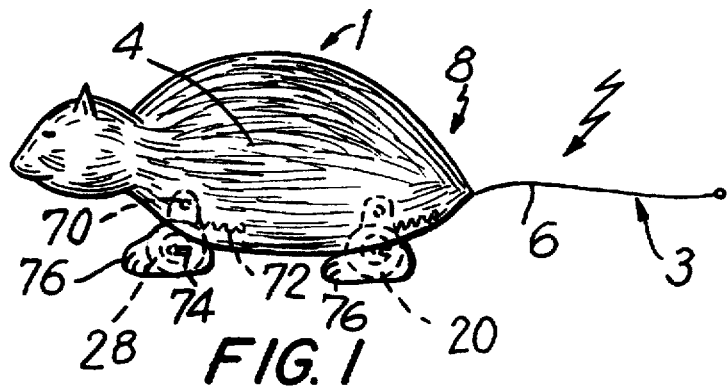
FIG. 1 is a side perspective view of the toy animal in the form of a mouse according to the present invention.

The toy system used with the game of the present invention comprises two separate units. The first unit is a mechanically movable toy animal 1. FIG. 1 shows toy animal 1 as including a platform 2 and a housing 4 in the shape of a mouse. Within the tail 3 of the mouse-shaped toy animal 1 is an antenna 6 for receiving remote electronic signals 8 that direct movement of toy animal 1. Housing 4 may simply be of plastic molded in the shape of the mouse or could be more realistically fashioned with a simulated hairy pelt and paws 76 oscillate about a pivot 70 mounted to the housing 4. Pin member 74 which is rotatably mounted on axle 18 strikes a portion of the inside surface of paw member 76 moving it forward about pivot 70. Spring 72 is attached to the rear portion of paw 76 and to a portion of housing 4 pulling paw 76 rearwardly when pin 74 is no longer in engagement with that portion of paw 76 causing it to move rearwardly, thus simulating a running motion when the mouse 1 moves.

Figure 2:
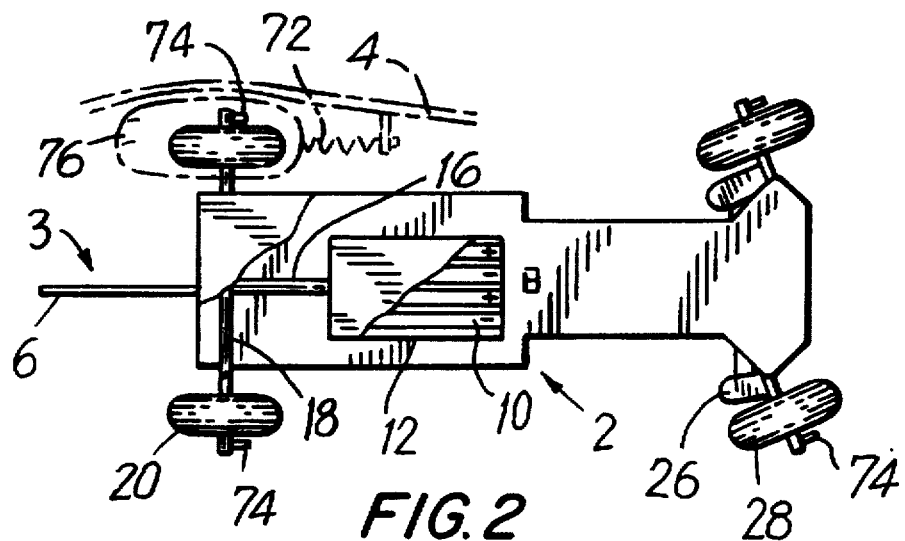
FIG. 2 is a highly diagrammatic bottom plan view, partially cut away, of the toy animal (without housing) according to FIG. 1.

FIG. 2 views toy animal 1 in bottom plan view to better reveal certain of the mechanical operating features. Platform 2 is powered by a series of four size AAA alkaline batteries 10 within the battery receptacle 12 shown in the partially revealed form.

Batteries 10 power a motor 14 which activates a geared drive train 16 which, in turn, transmits power to a rear axle 18 for driving rear wheels.

Figure 3:
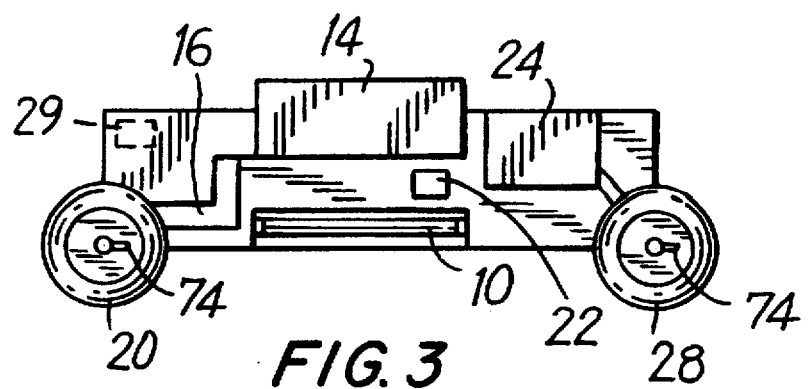
FIG. 3 is a highly diagrammatic cross-sectional view along lines 3—3 of FIG. 2.

FIG. 3 best shows the drive train mechanisms. This figure also illustrates in highly schematic form a remote electronic signal receiver 22 which in conjunction with motor 14 , a front drive servo-mechanism 24 and pivot axles 26 steer front wheels 28. Vibration gear box 29 , shown schematically, operates oscillatory movements of tail 3 and can also provide "breathing" simulating movement to areas of the housing. Drive systems such as schematically illustrated in the FIGS. 2 and 3 are well known in the art and therefore not provided in high detail. For instance, suitable drive systems are more precisely defined in U.S. Pat. No. 3,303,821, U.S. Pat. No. 4,208,834 and U.S. Pat. No. 4,799,915, all herewith included by reference. Moreover, a basic mechanically movable platform with wheels, drive system and remote electronic signal receiver is commercially available within many model racing car kits. One such kit is the "Pocket Flyers" radio controlled racer Model 32250 sold by Nikko America, Inc. This racer five inches long, three inches wide and 1.5 inches high and operates on a 27.145 MHz frequency.

Figure 4:
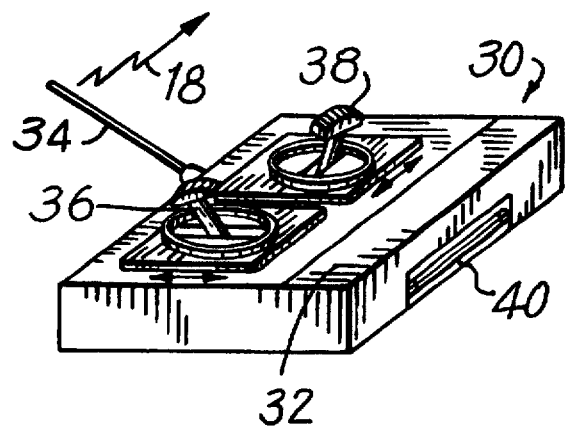
FIG. 4 is a perspective view of a control box according to the present invention.

FIG. 4 illustrates the second unit required by the toy system of the present invention. This unit is a control box 30 that includes a radio frequency transmitter 32 and associated transmitting antenna 34. Transmitted electronic signals 8 are controlled by a pair of switches operated through joy-sticks 36 and 38. The stick 36 directs an electronic signal which drives toy animal 1 either in a forward or reverse direction. Stick 38 transmits an electronic signal driving toy animal 1 either leftward or rightward. Power is supplied by a 9 volt battery 40.

Figure 5:
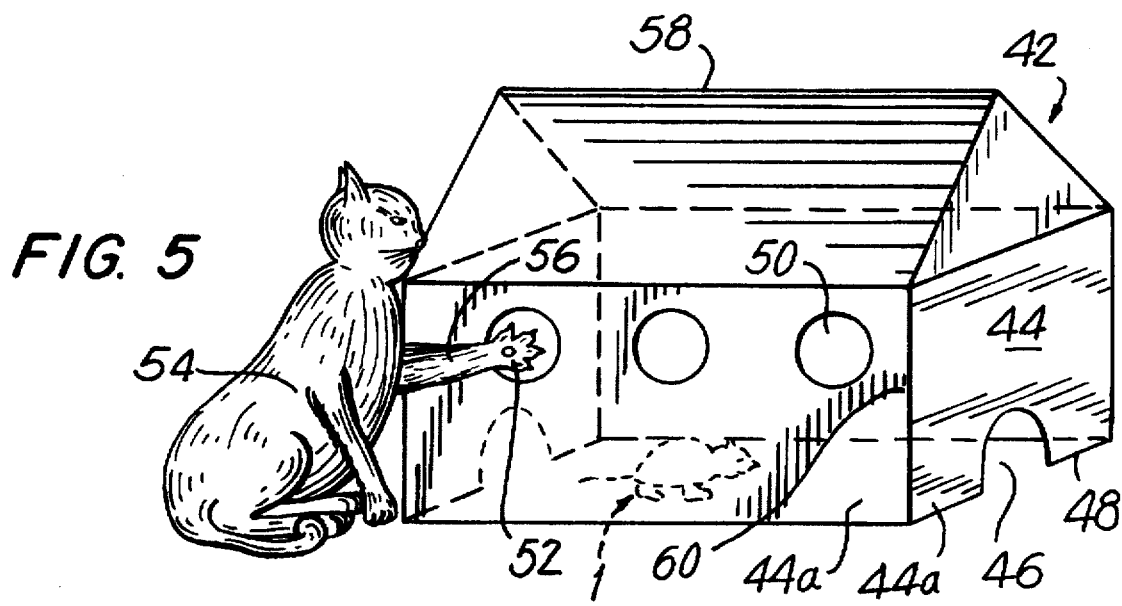
FIG. 5 is a perspective view of the enclosure, the toy mouse therewithin and a live pet cat.

FIG. 5 illustrates an enclosure unit for the toy system as an optional prop according to the present invention. A house-like structure 44 may be formed of a transparent or at least a translucent plastic. A sufficient internal area within structure 42 should be present to allow for movement therewithin of toy animal 1. For instance, the enclosed area within the structure 42 is preferably at least four cubic feet, optimally the area may range from about 6 to about 25 cubic feet. Walls 44 forming structure 42 also include at least one opening 46 at a base 48 of walls 44 adjacent level ground. A series of window holes 50 are formed in walls 44 at a distance above base 48. Window holes 50 are of a size sufficient for a paw 52 of a domestic cat 54 to pass through. Of course, the window holes 50 should be smaller than an upper limb 56 of the cat.

Figure 6:
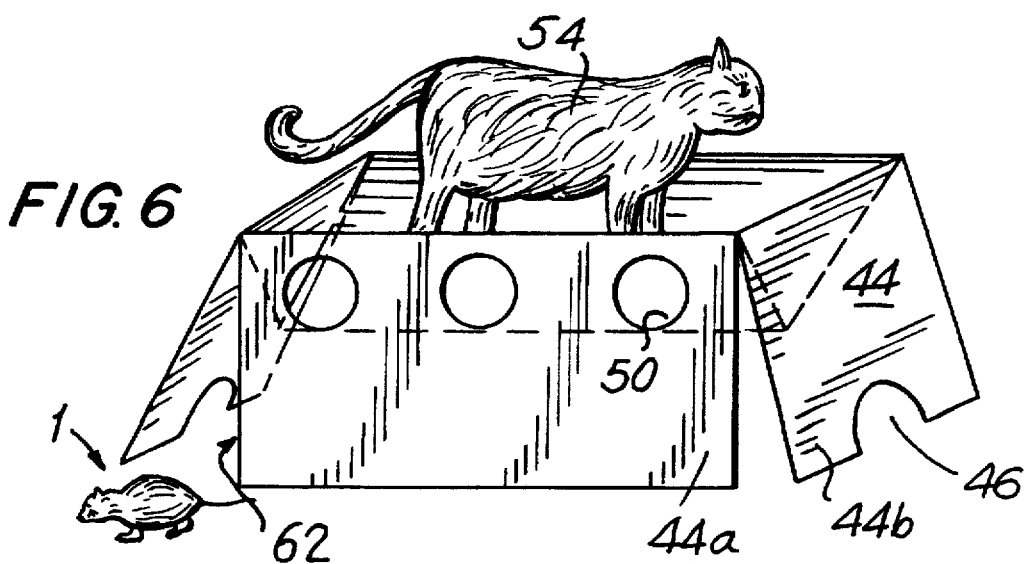
FIG. 6 is a perspective view similar to FIG. 4 except for the cat standing on the roof of the enclosure collapsing same.

Structure 42 is fashioned with a roof 58 and supported by orthogonally oriented walls 44 a and 44 b juxtaposed but unjoined along border 60. This arrangement, as shown the FIG. 6, allows roof 58 to collapse under the weight of cat 54 attempting to surmount structure 42. Under collapsed conditions, toy animal 1 will have a further opening 62 for egress. The above embodiments are given only for illustrative purpose and by way of limitation, further modifications being evident to those skilled in the art all of which will fall within the scope and purview of this invention.

What is claimed is:

1. A method for amusing a live pet animal with a game comprising:

provinding a mechanically movable toy animal resembling a rodent, the movable toy animal comprising:
- a platform mounted with a means for receiving a remote electronic signal;
- a means for mechanically inducing motion of said platform based upon activation by said remote electronic signal and being mounted on said platform;
- a first power source for operating said motion including means; and
- a housing covering said platform and said motion inducing means, said housing being in a shape of a rodent;

providing a control box separate from said toy animal comprising:

a means for transmitting said remote electronic signal;

a means for regulating said remote electronic signal so as to alter directional movements of said toy animal; and a second power source for operating said control box; wherein the method comprises:
directing by remote control through said control box said toy animal into a line of vision of said live pet animal; and
evading capture of said toy animal by said live pet animal through manipulation by further remote control of said toy animal.

2. The method according to claim 1, wherein said rodent is selected from the group consisting of a mouse, rat, squirrel and rabbit.

3. The method according to claim 1, wherein said remote electronic signal is a radio frequency signal.

4. The method according to claim 1, wherein said remote electronic signal is received through an antenna attached to said housing and camouflaged to resemble a tail of said rodent.

5. The method according to claim 1, further comprising a sound system positioned within said toy animal or said control box to emit sounds mimicking sounds emitted by a natural animal which said toy animal is created to resemble.

6. The method according to claim 1, wherein said first and second power sources are batteries.

7. The method according to claim 6, wherein said first power source is a plurality of AAA size batteries and said second power source is at least one 9 volt size battery.

8. The method according to claim 6, wherein said batteries are selected from the group consisting of alkaline and Ni/Cd type batteries.

9. The method according to claim 1, wherein said live pet animal is a cat or a dog.

10. The method according to claim 1, further comprising vibrating a tail of said toy animal.

11. A method for mentally and physically stimulating a live pet which is a cat or a dog with a game whose equipment comprises a mechanically movable toy animal shaped as a rodent and control means separate from said toy animal, said control means regulating movement of said toy animal through transmission of a remote electronic signal, the method comprising:

(I) providing a mechanically movable toy animal resembling a rodent;
(ii) directing by remote control through said control means said toy animal so as to be sensed by said live pet animal; and
(iii) manipulating said toy animal by further remote control so that the toy animal can be captured by said live pet animal.

12. A method according to claim 11 further comprising vibrating said toy animal, said toy animal having a tail at one end and flanked by abdominal areas, said vibrating causing oscillation of the tail or abdominal areas of the said animal.

13. A method according to claim 11, wherein said live pet animal is a cat or a dog.

* * * * *